United States Patent [19]

Principato

[11] Patent Number: 5,340,493
[45] Date of Patent: Aug. 23, 1994

[54] LOW-VOLATILITY CLEANING COMPOSITIONS FOR PRINTING INKS

[76] Inventor: Richard J. Principato, 1632 Arrowwood Dr., Easton, Pa. 18042

[21] Appl. No.: 932,764

[22] Filed: Aug. 20, 1992

[51] Int. Cl.$^5$ .................. C09D 9/00; C09D 9/04; C11D 7/50
[52] U.S. Cl. .................. 252/462; 252/170; 252/171; 252/172; 252/173; 252/DIG. 8; 134/38; 134/39; 134/40
[58] Field of Search .............. 252/162, 170, 171, 172, 252/173, DIG. 8; 134/38, 39, 40

[56] References Cited

U.S. PATENT DOCUMENTS

| | | | |
|---|---|---|---|
| 3,923,701 | 12/1975 | Rutherford et al. | 252/544 |
| 4,135,878 | 1/1979 | Bishop et al. | 8/139 |
| 4,166,151 | 8/1979 | Jahnke | 252/396 |
| 4,659,498 | 4/1987 | Stoufer | 252/170 |
| 4,664,721 | 5/1987 | Valasek | 134/26 |
| 4,673,524 | 6/1987 | Dean | 252/118 |
| 4,707,293 | 11/1987 | Ferro | 252/162 |
| 4,822,514 | 4/1989 | Becker | 252/108 |
| 4,877,556 | 10/1989 | Wilsberg et al. | 252/171 |
| 5,041,235 | 8/1991 | Kilbarger | 252/170 |
| 5,103,730 | 4/1992 | Sarda | 101/425 |
| 5,104,567 | 4/1992 | Staehr | 252/174.17 |
| 5,194,173 | 3/1993 | Folkard et al. | 252/170 |

*Primary Examiner*—Paul Lieberman
*Assistant Examiner*—M. Kopec
*Attorney, Agent, or Firm*—Eckert Seamans Cherin & Mellott

[57] ABSTRACT

This invention relates to cleaning compositions for cleaning printing inks from printing rollers, blankets, machinery and the like. More particularly, this invention relates to cleaning compositions that combine inter alia., good solvency power in printing inks along with low volatility of potentially hazardous organic compounds. The cleaning composition contains a mixture of a base solvent from about 20 to 95 weight percent of tall oil fatty acid ester combined with organic solvents and/or surfactant. Water may be added to the composition for removal or rinsing since the cleaning composition contains a water-active surfactant.

16 Claims, No Drawings

LOW-VOLATILITY CLEANING COMPOSITIONS FOR PRINTING INKS

BACKGROUND OF THE INVENTION

1. Field of the Invention

This invention relates to cleaning compositions for cleaning printing inks, and the like, from printing rollers, blankets, machinery, and the like. More particularly, this invention relates to cleaning compositions that combine, inter alia., good solvency power in printing inks with low volatility of potentially hazardous organic compounds.

2. Background of the Invention

Offset printing, also known as offset lithography, is a large and established industry which encompasses from the newspaper industry to quick copy shops. In the United States alone, over 60,000 plants and businesses are dedicated to offset printing.

Offset printing can be performed on a wide variety of printing press equipment, including sheet-fed and web systems. These printing systems are available in a wide variety of sizes and speeds. A common factor of the above offset printing systems is the method of offset printing, i.e., printing ink which is typically manufactured from various petroleum or vegetable oil sources, is applied to a substrate such as paper, plastic, or foil. The printing ink is applied by way of ink rollers to a printing plate which transfers the printed image to the impression cylinder which is covered with a rubber printing blanket. The printing blanket then transfers the printed image to the substrate.

Periodically, the ink rollers and printing blankets need to be cleaned to insure the quality of the printing or to change ink colors for another printing job. It is known that offset printers are routinely contacted with many solvents and compounds which are used for cleaning the printing ink therefrom. The most commonly used solvents are generically classified as aliphatic hydrocarbons, aromatic hydrocarbons, chlorinated hydrocarbons and oxygenated solvents. Aliphatic hydrocarbons are characterized by a straight or branch chain arrangement of constituent carbon atoms. The aliphatic hydrocarbons are comprised of three subgroups: (1) paraffins, (2) olefins, and (3) acetylenes. Aromatic hydrocarbons are characterized by unsaturated cyclic hydrocarbons containing one or more rings. They are typified by a benzene adduct which comprises a six-carbon ring containing three double bonds. Chlorinated hydrocarbons comprise carbon chain in which one or more of the hydrogen atoms has been replaced by chlorine. Oxygenated solvents are those having hydroxyl or carbonyl groups which are more polar that the relatively nonpolar hydrocarbon solvents.

However, organic solvents used for cleaning inks create environmental and physiological problems in industry. Volatile organic compounds emitted therefrom are known to be hazardous. It would be desirable to provide a cleaning composition for printing inks and the like having low volatility of organic compounds combined with good solvency power. In the past, printers used the above types of solvents and combinations thereof without regard to emissions and pollution concerns. Furthermore, many solvent products used to clean printing inks contained carcinogenic or reproductive toxins, thereby exposing workers to unnecessary risks.

The heightened awareness of the hazardous nature of the above solvent compositions has led legislators to promulgate new and more stringent air pollution and safety laws. Therefore alternative technologies used for cleaning printing ink from rollers and blankets are now being requested by the marketplace. More specifically, the new Clean Air Act of 1990 has placed tremendous pressures on printers to reduce their emissions, otherwise known as volatile organic compounds (VOC's).

The current conventional cleaning composition technologies are petroleum solvents, chlorinated hydrocarbons, and other organic chemicals which approach 100% VOC content. The Clean Air Act and various state laws, such as California Rule 1172, require printers to acquire emission permits to limit and reduce the use of VOC products in their operations. Thus it would be desirable to provide alternative cleaning compositions to lower VOC's without sacrificing cleaning efficiency and productivity. Furthermore, the reduction of VOC's relates to increased worker safety, since reduced VOC's translates to less solvent exposure to the user.

Various alternative technologies to reduce VOC's have been developed and marketed with limited success. U.S. Pat. No. 5,104,567 discloses environmentally acceptable cleaning liquids for the removal of printing inks consisting of 90-99% vegetable oil, in particular soy oil, and 1-10% surfactant emulsifier. These compositions were specifically designed to replace traditional cleaning liquids based on petroleum spirit and other mineral oil products and aromatic solvents. However, although this technology reduces VOC's, it requires constant rinsing with water, contributing to hazardous waste generation, to remove the oily residue which remains on the roller and blanket surfaces. Also, if the emulsifier is not completely removed from the ink rollers, the ink will not adhere to the rollers and "stripping" will occur. This type of roller contamination is common when using products with such a high emulsifier content. Furthermore, these types of products lack sufficient cleaning power or cutting ability to clean ink efficiently which increases production downtime.

Another technology known to lower the VOC's of printing ink cleaners includes blending organic solvents with water and emulsifiers. In this technology, the water acts as a zero VOC base of the product. Unfortunately, water does not clean, i.e., solubilize or degrade, printing ink (i.e., oil based) and weakens the performance of the cleaner, thereby decreasing cleaning efficiency and productivity. These products also tend to be unstable emulsions which separate in storage containers and easily freeze in transportation.

In an attempt to stabilize such an emulsion, U.S. Pat. No. 4,511,488 discloses an emulsion cleaning agent based on D'limonene, a terpene hydrocarbon. This water/terpene/emulsifier blend effectively lowers VOC's, but because so much emulsifier is used to stabilize the product, roller contamination again becomes a production concern. Additionally, water technologies cannot be used in cleaning inks from webs presses while they are at full production speed which is a common occurrence. This is due to the fact that water will tear the substrate, such as paper, and "break" the web, thereby, resulting in press downtime.

Other attempts to reduce VOC's from ink cleaning compositions using non-aqueous bio-degradable liquid compositions are known. U.S. Pat. No. 4,664,721 discloses a printing ink cleaning composition consisting essentially of about 30-85% N-methyl-2-pryyolidone, about 10-35% of an oxygenated solvent and about 1-5% of a surfactant. However, these products are 80-90% volatile by volume.

Tall oil fatty acid esters are known in the printing ink industry as a component of printing inks themselves, which are employed to reduce tack and viscosity of ink compositions. However it has not heretofore been suggested that such aliphatic esters, such as tall oil fatty acid esters, may be used in combination with other solvents and surfactants as an ink cleaning composition with low VOC content and good solvency power to be effective and also comply with environmental health and safety standards.

In addition, other cleaning compositions that contain tall oils, tall oil fatty acids and derivatives of tall oil fatty acids are disclosed in U.S. Pat. Nos. 3,923,701; 4,673,524; 4,822,514; 5,041,235; and 5,103,730.

SUMMARY OF THE INVENTION

It is the object of the invention to provide cleaning compositions for printing inks containing low VOC's.

It is another object of the invention to provide cleaning compositions for printing inks that are environmentally acceptable.

It is another object of the invention to provide cleaning compositions containing a tall oil fatty acid ester, which provides good solvation and degradation power of printing inks with low VOC's.

It is another object of the invention to provide cleaning compositions that are bio-degradable.

These and other objects of the invention are achieved by providing a cleaning composition for cleaning printing inks and the like from printing rollers, blankets, machinery, and the like that contains a mixture of a tall oil fatty acid ester, organic solvents such as aliphatic hydrocarbons, aromatic hydrocarbons, oxygenated solvents, terpene hydrocarbons, and mixtures thereof, and surfactants (emulsifiers). These compositions have been found to be unique with respect to being able to achieve efficient cleaning of various types of printing inks while at the same time lowering VOC emissions and enhancing environmental health and worker safety.

The cleaning compositions of this invention are directed to cleaning printing inks and the like from printing ink rollers, printing blankets, printing machinery and the like, used in the offset printing process. The ink cleaning compositions of the present invention significantly lower the amount of volatile organic compounds (VOC's) emitted by the use of ink cleaners and lessen the exposure of workers to 100% VOC solvents which are traditionally used in the ink cleaning process. Thus, the compositions of the present invention provides productive and efficient cleaning with minimized adverse environmental impact and enhanced health and safety of the worker over traditional ink cleaning products.

It is considered highly unexpected and unobvious that an ink cleaning composition based on tall oil fatty acid ester could effect an efficient cleaning composition that also minimizes environmental impacts and health concerns related to products traditionally used for ink cleaning applications. For the purposes of this invention, tall oil fatty acid ester is essentially required to operate in combination with aliphatic hydrocarbons, aromatic hydrocarbons, oxygenated solvents, or terpene hydrocarbons, and mixtures thereof and surfactant in order to achieve the desired results. In the offset printing industry, it has not been heretofore suggested than an ink cleaning composition that lowers VOC emissions and enhances worker safety may be provided that still achieves the highly desirable cleaning effects that have been provided for by the compositions of the present invention.

DETAILED DESCRIPTION OF THE INVENTION

The essential components of the inventive cleaning compositions comprise tall oil fatty acid esters, organic solvents such as aliphatic hydrocarbons, aromatic hydrocarbons, oxygenated solvents or terpene hydrocarbons, and mixtures thereof and surfactant. The cleaning compositions may comprise a mixture of about 20-95% by weight of tall oil fatty acid ester about 4-55% by weight of an organic solvent, and about 1-10% by weight of a surfactant. Preferably, the cleaning composition contains a mixture of about 40-90% by weight of tall oil fatty acid ester, 9-40% by weight of an organic solvent, and 1-5% by weight of a surfactant. Cleaning compositions comprising tall oil fatty acid esters and either surfactant or solvent are also contemplated.

The tall oil fatty acid ester acts as the base of the ink cleaning composition of the present invention. It is uniquely suited to this application because it is extremely low in volatile compounds. However, used by itself, it is not an efficient or productive product for the application.

Examples of commercially available tall oil fatty acid esters suitable for use in the cleaning compositions of this invention are NIREZ 9011 manufactured by Arizona Chemical Company, Panama City, Fla., and UNIFLEX 171 manufactured by Union Camp Corporation, Wayne, N.J.

The compositions of these tall oil fatty acid esters, by way of example, substantially comprise a mixture of alkyl esters, preferably $C_1$ alkyl or methyl esters, of aliphatic tall oil fatty acids, preferably a mixture of $C_{18}$ aliphatic carboxylic tall oil fatty acids, saturated or unsaturated. A preferred composition of the tall oily fatty acid ester according to the invention of $C_{18}$ oleic acid and $C_{18}$ linoleic acid, other $C_{18}$ fatty acids, rosin acids, other fatty acids, and unsaponifiables.

The compositional analysis of the tall oil fatty acid methyl ester sold under the trademark NIREZ 9011 is approximately as shown in Table 1 and Table 2:

TABLE 1

| NIREZ 9011 (97.5% Esterified as a Methyl Ester) | |
| --- | --- |
| Fatty Acids | 92.5 |
| Rosin Acids | 1.2 |
| Unsaponifiables | 3.8 |
| Dimer Acids | 2.5 |
| | 100.0 |

TABLE 2

| Fatty Acids in NIREZ 9011 | | |
| --- | --- | --- |
| Linoleic Acid | 24.6 | $C_{18}H_{32}O_2$ |
| Oleic Acid | 28.5 | $C_{18}H_{34}O_2$ |
| Stearic Acid | 7.1 | $C_{18}H_{36}O_2$ |
| *Other $C_{18}$ Fatty Acids | 38.0 | |
| Palmitic Acid | 1.8 | |
| | 100.0 | |
| Total Unsaturated | 55.1 | |
| Total Saturated | 44.9 | |

TABLE 2-continued

Fatty Acids in NIREZ 9011

100.0

*Other $C_{18}$ Fatty Acids include:
Scrambled $C_{18}$ fatty acids
Chain branched oleic type
One double bond structurally hindered and inert Therefore, the tall oil fatty acid ester according to the invention is most preferably primarily made of $C_1$ alkyl esters of tall oil fatty acids primarily comprising $C_{18}$ tall oil fatty acids selected primarily from $C_{18}$ oleic acid and $C_{18}$ linoleic acid, and also including rosin acids, unsaponifiables and other saturated and unsaturated fatty acids.

Examples of aliphatic hydrocarbons suitable for use in the cleaning compositions of this invention are mineral spirits, aliphatic naptha, such as Solvent 140 (medium aliphatic, $C_{9-12}$, hydrocarbons), Solvent 360, Solvent 460, and V, M, & P Naphtha (light aliphatic, $C_{7-8}$, hydrocarbons), Stoddard Solvent, gasoline, kerosene, and the like. Examples of suitable aromatic hydrocarbons are toluene, xylene, Aromatic 100, (petroleum hydrocarbon mixture of $C_{9-11}$ aromatic hydrocarbons which contain 1,2,4-trimethylbenzene, xylene, cumene and ethyl benzene), Aromatic 150 (petroleum hydrocarbon mixture of $C_{9-11}$ aromatic hydrocarbons which contain napthalene), benzene, ethyl benzene and the like. Examples of suitable oxygenated solvents are 2-butoxy ethanol, 2propoxyethanol, dipropylene glycol monomethyl ether, isopropyl alcohol, acetone and the like. Examples of suitable terpene hydrocarbons are D'limonine, dipentene, and the like. Any of these solvents above, alone or in combination, may be used in the cleaning composition.

The surfactant may be a nonionic or anionic surfactant. The surfactant is preferably nonionic such as nonylphenoxypoly (ethylenoxy) ethanol which is manufactured by Rhone-Poulenc under the tradename Igepal Co-530.

Therefore, in accordance with the broader principles of this invention, materials from the above mentioned categories are suitable for use in blending with the tall oil fatty acid ester, depending upon the cleaning, environmental and safety criteria required by a specific composition. The compositions are made by combining combinations of various aliphatic, aromatic, terpene hydrocarbon or oxygenated solvents and mixtures thereof and surfactant with the tall oil fatty acid ester to achieve a desired result. Water may be added to such combinations.

Aliphatic hydrocarbons are generally used for their ink cleaning solvency. Aromatic hydrocarbons are generally used for their ink cutting power. Oxygenated solvents are generally used for their wide-range of solvency for both oil and water contaminants. Terpene hydrocarbons are generally used for ink cutting power, and in some cases fragrancing. And surfactants are used, in combination with the above solvents and the tall oil fatty acid ester, to make the products water-miscible, i.e., the ability to link oil and water chemistries together for a short period of time, which enhances the cleaning ability of the ink cleaning product wherein water may be added to the water-active cleaning composition for subsequent removal.

This invention will be hereinafter explained in more detail by way of example. However, these examples should not be construed to limit the scope of the invention thereto and are to be understood merely for the purpose of illustration. (All examples are % by weight).

Example 1

| | |
|---|---|
| Aromatic 100 | 10% |
| Mineral Spirits | 20% |
| Igepal Co-530 | 1% |
| Tall Oil Fatty Acid Ester | 69% |

This formulation provides for 30% VOC content (Tested by EPA Method 24) and low aromatic content. It is a slow evaporating formula.

Example 2

| | |
|---|---|
| Aromatic 100 | 16.4% |
| Mineral Spirits | 36.4% |
| Igepal Co-530 | 1% |
| Tall Oil Fatty Acid Ester | 46.2% |

This formulation provides faster drying than Example 1 and has better cutting power because of higher aromatic content. There is a 49% VOC content.

Example 3

| | |
|---|---|
| Dipropylene Glycol Monomethyl Ether | 20% |
| Igepal Co-530 | 1% |
| Tall Oil Fatty Acid Ester | 79% |

This formulation provides a 20% VOC content. There are no petroleum hydrocarbons and it has a very high flash point. Furthermore, the formulation is biodegradable.

Example 4

| | |
|---|---|
| Aromatic 150 | 16.4% |
| Solvent 140 (Aliphatic) | 36.4% |
| Igepal Co-530 | 1% |
| Tall Oil Fatty Acid Ester | 46.2% |

This formulation has a higher flash point than Example 2, and has excellent cleaning ability.

Example 5

| | |
|---|---|
| D'limonene | 15% |
| Dipropylene Glycol Monomethyl Ether | 35% |
| Igepal Co-530 | 1% |
| Tall Oil Fatty Acid Ester | 49% |

This formulation is a stronger cleaner than Example 3. Furthermore, the formulation is biodegradable.

What is claimed is:

1. A cleaning composition for cleaning printing inks, comprising a mixture of:
   a. from about 20 to 95% by weight of a tall oil fatty ester comprising at least one $C_1$ alkyl ester of a $C_{18}$ aliphatic carboxylic tall oil fatty acid;
   b. from about 4 to 55% by weight of an organic solvent; and
   c. from about 1 to 10% by weight of a surfactant.

2. The cleaning composition of claim 1, wherein said organic solvent is selected from the group consisting of an aliphatic hydrocarbon, an aromatic hydrocarbon, an oxygenated solvent, a terpene hydrocarbon, and mixtures thereof.

3. The cleaning composition of claim 2, wherein said aliphatic hydrocarbon is selected from the group consisting of mineral spirits, naptha, stoddard solvent, gasoline, kerosene, and mixtures thereof.

4. The cleaning composition of claim 2, wherein said aromatic hydrocarbon is selected from the group consisting of benzene, toluene, xylene, petroleum hydrocarbons, ethyl benzene, and mixtures thereof.

5. The cleaning composition of claim 2, wherein said oxygen solvent is selected from the group consisting of 2-butoxy ethanol, 2-propoxyethanol, dipropylene glycol monomethyl ether, isopropyl alcohol, and acetone, and mixtures thereof.

6. The cleaning composition of claim 2, wherein said terpene hydrocarbon is selected from the group consisting of D'limonine, dipentene, and mixtures thereof.

7. The cleaning composition of claim 1, wherein said surfactant is selected from the group consisting of nonionic and anionic surfactants.

8. The cleaning composition of claim 7, wherein said surfactant is nonionic nonylphenoxypoly (ethylenoxy) ethanol.

9. The cleaning composition of claim 1, wherein said organic solvent is selected from the group consisting of an aliphatic hydrocarbon and an aromatic hydrocarbon and mixtures thereof.

10. The cleaning composition of claim 1, wherein said organic solvent is selected from the group consisting of an oxygenated solvent and a terpene hydrocarbon, and mixtures thereof.

11. The cleaning composition of claim 1, further comprising water as a rinsing agent.

12. The cleaning composition of claim 1, wherein said composition is bio-degradable.

13. The cleaning composition for cleaning printing inks, comprising a mixture of:
   a. from about 40 to 90% by weight of a tall oil fatty acid ester comprising at leat one $C_1$ alkyl ester of a $C_{18}$ aliphatic carboxylic tall oil fatty acid;
   b. from about 9 to 40% by weight of an organic solvent; and
   c. from about 1 to 5% by weight of a surfactant.

14. The cleaning composition for cleaning printing inks, comprising a mixture of:
   a. from about 20% to 99% by weight of a tall oil fatty acid ester comprising at least one $C_1$ alkyl ester of a $C_{18}$ aliphatic carboxylic tall oil fatty acid; and
   b. at least 1% by weight of a surfactant.

15. The cleaning composition of claim 14, further comprising water.

16. The cleaning composition for cleaning printing inks, comprising a mixture of:
   a. from about 20% to 95% by weight of tall oil fatty acid ester comprising at least one $C_1$ alkyl ester of a $C_{18}$ aliphatic carboxylic tall oil fatty acid; and
   b. at least 5% by weight of an organic solvent.

* * * * *

UNITED STATES PATENT AND TRADEMARK OFFICE
CERTIFICATE OF CORRECTION

PATENT NO. : 5,340,493
DATED : August 23, 1994
INVENTOR(S) : Richard J. Principato It is certified that error appears in the above-indentified patent and that said Letters Patent is hereby corrected as shown below:

In column 4, line 44, after "invention" insert --is, for example, sold under the trademark NIREZ 9011 by Arizona Chemical Company that is primarily a mixture of $C_{18}$ tall oil fatty acid methyl esters, comprising a mixture of methyl esters--.

In column 5, line 30, "2propoxyethanol" should read --2-propoxyethanol--.

Signed and Sealed this

Sixth Day of December, 1994

Attest:

BRUCE LEHMAN

*Attesting Officer*     *Commissioner of Patents and Trademarks*